United States Patent [19]
Kloss et al.

[11] Patent Number: 5,612,262
[45] Date of Patent: Mar. 18, 1997

[54] COLORED BOROSILICATE GLASS

[75] Inventors: Thomas Kloss; Eckhart Watzke, both of Jena, Germany

[73] Assignee: JENAer GLASWERK GmbH, Jena, Germany

[21] Appl. No.: 511,807

[22] Filed: Aug. 7, 1995

[30] Foreign Application Priority Data

Aug. 10, 1994 [DE] Germany ............... 44 28 234.6

[51] Int. Cl.$^6$ ............... C03C 3/091; C03C 4/08
[52] U.S. Cl. ............... 501/65; 501/66; 501/905
[58] Field of Search ............... 501/65, 66, 905

[56] References Cited

U.S. PATENT DOCUMENTS

| | | | |
|---|---|---|---|
| 1,830,902 | 11/1931 | Hood | 501/31 |
| 4,116,704 | 9/1978 | Boyd et al. | 501/66 |
| 4,870,034 | 9/1989 | Kiefer | 501/66 |
| 5,258,336 | 11/1993 | LaMastro et al. | 501/66 |

FOREIGN PATENT DOCUMENTS 0077144  5/1985  Japan ............... 501/95

OTHER PUBLICATIONS

"Coloured Glasses" by W. A. Weyl, 1959, Society of Glass Technology, Sheffield, pp. 212 to 217. no month.
"Chemical Abstracts", vol. 104, No. 16, Apr. 21, 1986, Abstract No. 134720, p. 297.
"Chemical Abstracts", vol. 116, No. 2, Jan. 13, 1992, Abstract No. 10309k, p. 232.
"Chemical Abstracts", vol. 119, No. 8, Aug. 23, 1993, Abstract No. 78121k, p. 367.
"Database WPI", Week 07, Derwent Publications Ltd., London, GB, Jan. 9, 1984.
"Glas" by H. Scholze, Springer Verlag, 1988, p. 219. no month.
"Optical Absorption of Glasses" by George H. Sigel, Treatise on Materials, Science and Technology, vol. 12, Academic Press, 1977, p. 38. no month.

*Primary Examiner*—Mark L. Bell
*Assistant Examiner*—Louis M. Troilo
*Attorney, Agent, or Firm*—Walter Ottesen

[57] ABSTRACT

The invention relates to gray, bluish, blue to black colored borosilicate glasses which have a stepped transmission grade in the near infrared range or are fully non-transmitting. The borosilicate glass with defined additions of titanium dioxide is melted together with a reduction agent such as Si(metallic). The glasses produced in accordance with the invention are used as filters because of their absorption/transmission characteristic or, if the light transmissibility in the near infrared/infrared ranges is sufficiently low, the glasses can also be used as absorbers in solar technology, as a glass used in areas of the home and/or as decorative colored glass in construction and for decorating.

5 Claims, 1 Drawing Sheet

COLORED BOROSILICATE GLASS

FIELD AND BACKGROUND OF THE INVENTION

The invention relates to a borosilicate glass, which is colored bluish, blue to black with $Ti^{3+}$ ions, has a low transmission in the near infrared range (NIR) and the composition $SiO_2>78$; $B_2O_3>8$; $Al_2O_3$ 1.5 to 4; alkali oxide>2.

The glasses according to the invention are suitable for decorative applications because of their special absorption transmission characteristic. The applications include, for example, the use as a glass used in home kitchens, filters or, if the light transmissibility in the near infrared range is sufficiently low, the use as an absorber in solar technology.

The coloring of glass with trivalent titanium ions is known. [$Ti^{III}O_6$] colors the glass, for example, violet or brown. In this connection, reference can be made to the text of H. Scholze entitled "Glas", page 219, Springer Verlag 1988. Absorption bands occur in the range of approximately 400 to 800 nm in dependence upon the glass composition and the melt conditions.

It is also known that $Ti^{3+}$ ions, for example, in silicate glasses, can be stabilized only with difficulty. Here, reference can be made to the article of G. H. Sigel entitled "Optical Absorption of Glasses" published in the Treatise on Materials Science and Technology, Volume 12, page 38, Academic Press 1977.

When carbon or compounds containing carbons are used as a reducing agent, then large and nonuniform melting losses can be expected so that the color of the glass can only be reproduced with difficulty.

If metal or metal oxides are used as a reducing agent, these metals are built into the glass as oxides, then specific glass characteristics can change in an unwanted manner, for example, by an increase of the thermal expansion or by additional coloring effects occurring.

Furthermore, it can at times be necessary to adjust the oven atmosphere to increase the intensity of reduction in order to prevent the reoxidation of $Ti^{3+}$ ions to non-coloring $Ti^{4+}$ ions.

For high melting glasses such as borosilicate glasses, problems can occur in this manner when adjusting the necessary high temperatures.

It is furthermore known to color glass with cobalt compounds. Heavy metals can, however, have toxic effects when the glass is chemically attacked and dissolved components reach, for example, the drinking water. For this reason, the use of cobalt compounds must be excluded. Cobalt colored borosilicate glass furthermore has no or no adequate absorption in the near infrared range.

SUMMARY OF THE INVENTION

It is an object of the invention to color borosilicate glass gray, bluish, blue to black while at the same time obtaining a low transmission in the near infrared range. A further object is to provide thin layer thicknesses of borosilicate glass with these properties.

These objects are achieved in the present invention in that the borosilicate glass composition simultaneously contains 0.1 to 3 percent by weight $TiO_2$ and a reducing agent, preferably 0.01 to 0.1 percent by weight $Si°$.

It has been found that apparently trivalent titanium can be built into alkali weak borosilicate glass in a stable manner when a suitable reducing agent, for example, metallic silicon, is introduced simultaneously with the component $TiO_2$ in defined quantities into the batch.

In preferred embodiments, the colored borosilicate glass of the invention comprises (in percent by weight on oxide basis) 78 to 81 $SiO_2$; 12 to 13 $B_2O_3$; 2 to 4 $Al_2O_3$; 0 to 2 $Li_2O$; 0 to 3 $Na_2O$; 0 to 3 $K_2O$; 0.1 to 3 $TiO_2$ and 0.01 to 0.1 Si(metallic) or 78 to 80 $SiO_2$; 12 to 13 $B_2O_3$; 2 to 4 $Al_2O_3$; 1 to 2 $Li_2O$; 0 to 1.5 $Na_2O$; 1 to 3 $K_2O$; 0.5 to 2.5 $TiO_2$ and 0.02 to 0.07 Si (metallic) for a thermal expansion of $\alpha_{20/300} \leq 3.3 \times 10^{-6} K^{-1}$.

Small admixtures of $TiO_2$ and Si(metallic), that is, 0.1 to 0.5 percent by weight $TiO_2$ and 0.01 to 0.02 percent by weight Si(metallic), impart to the glass a light gray to bluish coloration.

The glass is colored blue to intensive blue when utilizing 0.5 to 2.5%-wt $TiO_2$ and 0.02 to 0.05%-wt Si(metallic). The near infrared absorption then increases greatly. If still larger quantities of $TiO_2$ and Si(metallic) are added to the batch, the glass is black and is completely non-transmissible in the ultraviolet, visible and near infrared ranges.

With an admixture of more than 3%-wt $TiO_2$, the glass and crystallization characteristics however begin to change negatively.

BRIEF DESCRIPTION OF THE DRAWINGS

The invention will be described more fully with reference to the accompanying drawing which is a transmission curve for glass according to the invention.

DESCRIPTION OF THE PREFERRED EMBODIMENTS OF THE INVENTION

Figure 1:
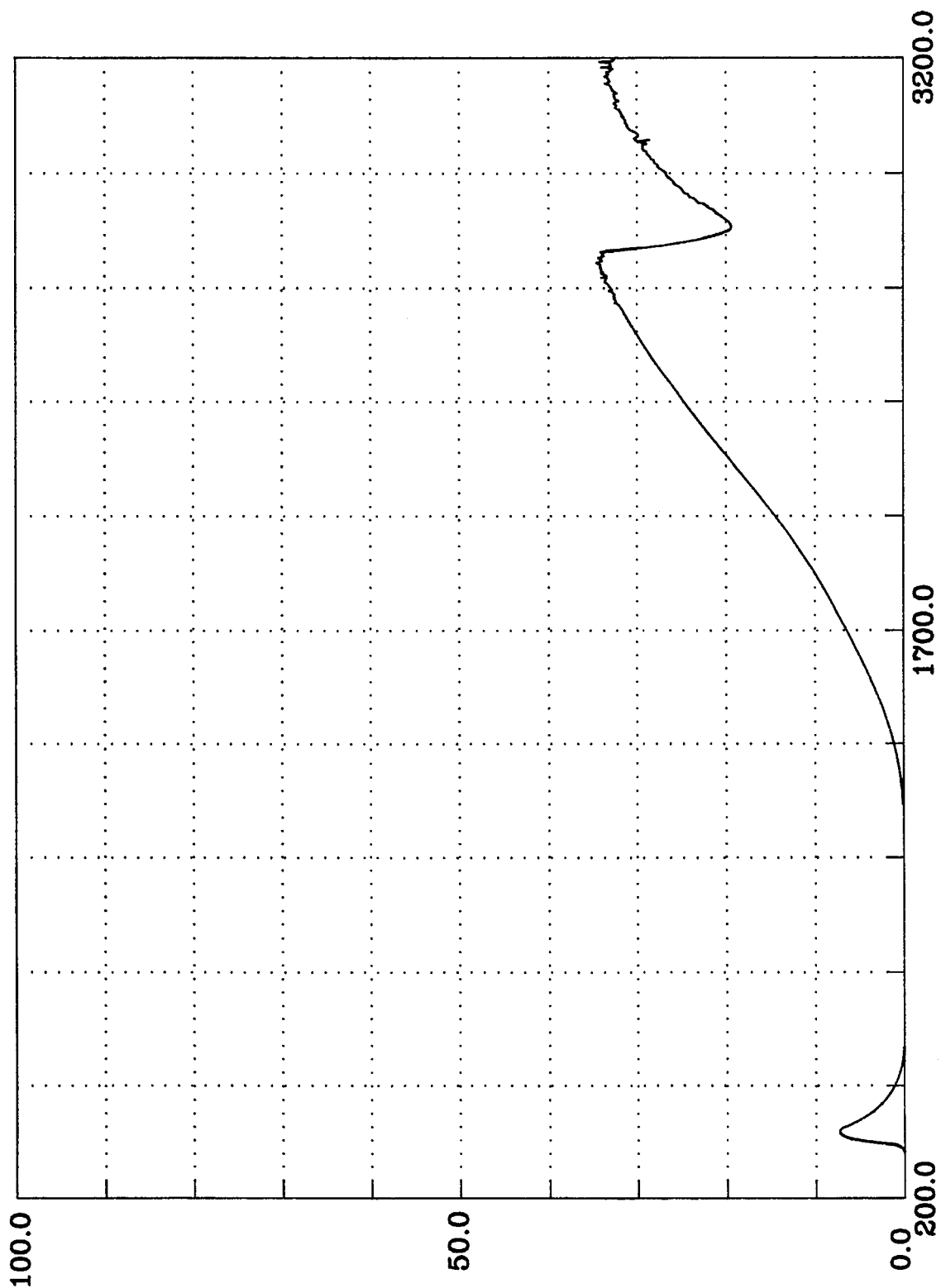

In the following, the invention is explained in greater detail with respect to an example and a drawing.

The following glass composition was melted to demonstrate the blue coloring according to the invention of alkali-weak borosilicate glass:

| Oxides | | Raw Materials |
| --- | --- | --- |
| $SiO_2$ | 78.50% by wt | $SiO_2$ |
| $B_2O_3$ | 12.50% by wt | $H_3BO_3$ |
| $Al_2O_3$ | 2.50% by wt | $Al(OH)_3$ |
| $Li_2O$ | 1.50% by wt | $Li_2CO_3$ |
| $Na_2O$ | 1.00% by wt | NaCl |
| $K_2O$ | 2.00% by wt | $K_2CO_3$ |
| $TiO_2$ | 2.00% by wt | $TiO_2$ |
| Si(met.) | 0.03% by wt | Si°(metallic) |
| | 100.03% by wt | |

The raw materials listed in the Table were used as glass components in preparing the batch. Oxidizing raw materials such as nitrate were not used. The $Na_2O$ was used as NaCl as a refining agent in the batch.

The melt was carried out in an electrically heated laboratory oven at air atmosphere in a quartz crucible at approximately 1600° C. in a time span of approximately 5 hours. Thereafter, the melt was homogenized by means of a quartz stirrer and was poured into an iron mold and cooled stress-free.

The thermal expansion of this glass amounts to $\alpha_{20/300}=3.2\times10^{-6}K^{-1}$ and the transformation temperature $T_g=470°$ C.

The drawing shows the transmission curve of the embodiment in the wavelength range of 200 to 3200 nm. The thickness of the measurement sample is 1 mm. For a thickness of several millimeters, the glass has an intensive blue and very decorative coloration so that it can, for example, be used in a home kitchen or for other decorative purposes.

The transmission curve further shows that the absorption in the range of sun radiation energy is so great that the glass can also be used as a solar absorber even when the glass is not completely transmissible in the visible range and is therefore easier to manipulate.

A further additional advantage of the glass of the invention compared to the standard "borosilicate glass 3.3" is seen in that the viscosity could be reduced. The glass is easier and more economical to melt and process. The thermal expansion was surprisingly further reduced.

It is understood that the foregoing description is that of the preferred embodiments of the invention and that various changes and modifications may be made thereto without departing from the spirit and scope of the invention as defined in the appended claims.

What is claimed is:

1. A colored borosilicate glass composition with $Ti^{3+}$ ions comprising (in percent by weight on oxide basis) $SiO_2>78$; $B_2O_3>8$; $Al_2O_3$ 1.5 to 4; alkali oxide >2 having an increasing near infrared radiation (NIR) absorption until becoming completely non-transmissible in the ultraviolet, visible and near infrared radiation (NIR) ranges and further comprising 0.1 to 3.0 percent by weight $TiO_2$ and a reducing agent.

2. A colored borosilicate glass composition with $Ti^{3+}$ ions comprising in percent by weight on oxide basis:

| | |
|---|---|
| $SiO_2$ | 78–81 |
| $B_2O_3$ | 12–13 |
| $Al_2O_3$ | 2–4 |
| $Li_2O$ | 0–2 |
| $Na_2O$ | 0–3 |
| $K_2O$ | 0–3 |
| $TiO_2$ | 0.1–3 |
| Si(met.) | 0.01–0.1 | having an increasing near infrared radiation (NIR) absorption until becoming completely non-transmissible in the ultraviolet, visible and near infrared radiation (NIR) ranges.

3. A colored borosilicate glass composition with $Ti^{3+}$ ions comprising in percent by weight on oxide basis:

| | |
|---|---|
| $SiO_2$ | 78–80 |
| $B_2O_3$ | 12–13 |
| $Al_2O_3$ | 2–4 |
| $Li_2O$ | 1–2 |
| $Na_2O$ | 0–1.5 |
| $K_2O$ | 1–3 |
| $TiO_2$ | 0.5–2.5 |
| Si(met.) | 0.02–0.07 | having an increasing near infrared radiation (NIR) absorption until becoming completely non-transmissible in the ultraviolet, visible and near infrared radiation (NIR) ranges and a thermal expansion of $\alpha_{20/300}\leq3.3\times10^{-6}K^{-1}$.

4. A borosilicate glass according to claim 1 having a gray color.

5. A borosilicate glass according to claim 1 having a blue to black color.

\* \* \* \* \*